June 19, 1962  P. C. NEILSEN  3,039,518
TUBELESS TIRE BEAD SEATING APPARATUS
Filed July 22, 1960  3 Sheets-Sheet 1

INVENTOR.
Peter C. Neilsen
BY
Zabel, Baker, York, Jones & Dithmar
Attorneys

June 19, 1962 P. C. NEILSEN 3,039,518
TUBELESS TIRE BEAD SEATING APPARATUS
Filed July 22, 1960 3 Sheets-Sheet 2
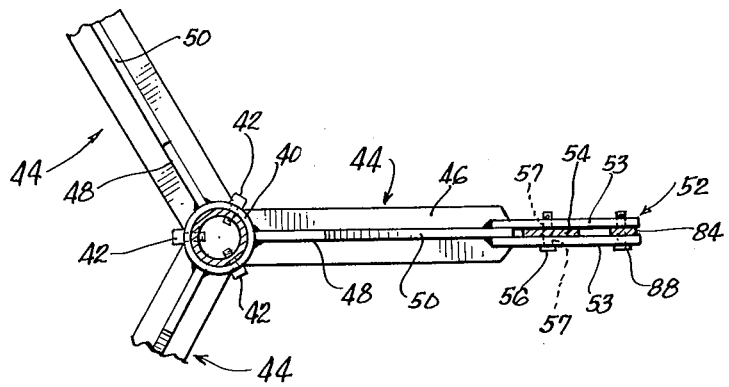
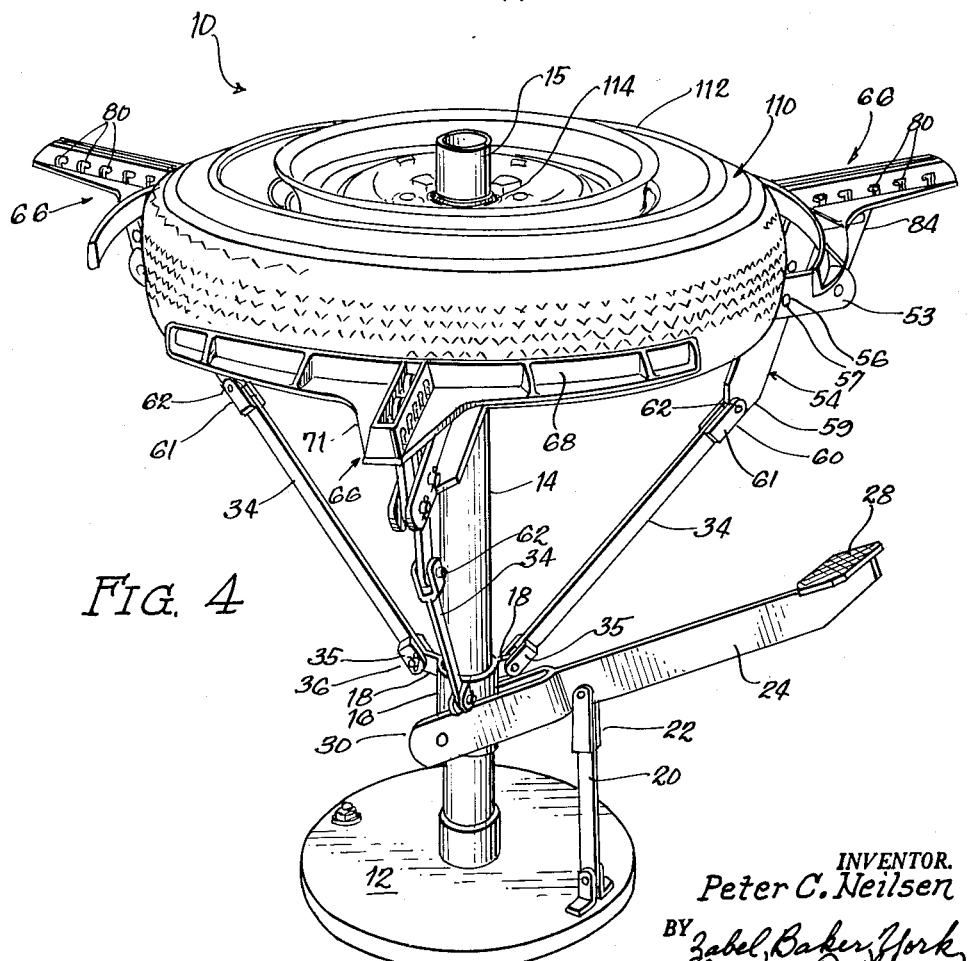
INVENTOR.
Peter C. Neilsen
BY Zabel, Baker, York,
Jones & Dithmar
Attorneys June 19, 1962 P. C. NEILSEN 3,039,518
TUBELESS TIRE BEAD SEATING APPARATUS
Filed July 22, 1960 3 Sheets-Sheet 3

INVENTOR.
Peter C. Neilsen
BY
Zabel, Baker, York, Jones & Dithmar
Attorneys

3,039,518
TUBELESS TIRE BEAD SEATING APPARATUS
Peter C. Neilsen, % Neilsen Products Co.,
Lake Elmo, Minn.
Filed July 22, 1960, Ser. No. 44,715
3 Claims. (Cl. 157—1.21)

This invention relates to tubeless tire bead seating apparatus, and more particularly to apparatus for causing the beads of a tubeless tire to move into air-sealing engagement with the seats on a wheel rim so the tire can be inflated.

One object of the invention is to provide improved apparatus for quickly and positively seating the beads of a tubeless tire on the seats of a wheel rim.

A further object is to provide a fast acting, simple to operate and reliable apparatus for squeezing tread portions of a tubeless tire so the beads of the tire are moved or expanded into air-sealing engagement with the seats on a wheel rim.

Yet another object is to provide apparatus of this character which is simple and inexpensive to manufacture.

Still another object is to provide apparatus of this type which easily can be adjusted to accommodate tires of various sizes.

Other objects, advantages and details of the invention will be apparent as the description proceeds, reference being had to the accompanying drawing wherein one form of the invention is shown. It is to be understood that the description and drawing are illustrative only, and that the scope of the invention is to be measured by the appended claims.

In the drawings:

FIG. 3 is a fragmentary plan view, partly in section, showing further details of the apparatus.

FIG. 4 is a perspective view of the apparatus with a tubeless tire and associated wheel mounted thereon.

Figure 1:
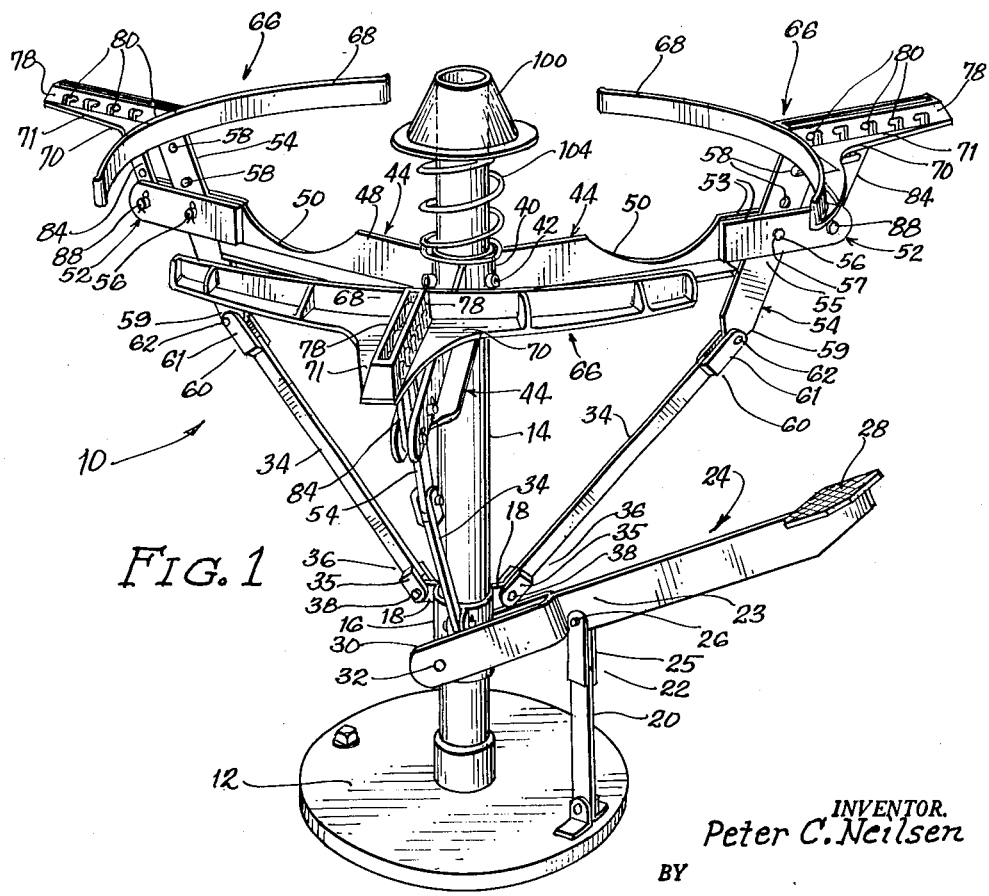
FIG. 1 is a perspective view of a tubeless tire bead seating apparatus embodying the invention.

Referring now to FIG. 1 of the drawings, the tubeless tire bead seating apparatus indicated generally by the reference numeral 10 includes a base 12 and an upstanding post 14. A collar 16 is slidably mounted on post 14. This collar, as illustrated, is provided with three ear members 18 equally spaced around the axis of post 14, but as will be apparent below, it may be desirable to use additional ear members in heavier duty apparatus.

A strut member 20 is mounted in a pivoted manner on base 12 in spaced relationship with post 14. Upper end 22 of member 20, as shown, has parallel arms or tines 25. A foot lever 24 is positioned between these tines and is pivotally mounted thereto by a pivot pin 26 which extends through tines 25 and an intermediate portion 23 of the foot lever.

One end of foot lever 24 has a foot pedal 28, and the opposite end 30 of the foot lever has tines 31 which are pivotally connected to slidable collar 16 by pivot pins 32 extending from tines 31 into recesses in the collar. With this arrangement, it is apparent that when pedal 28 is depressed, collar 16 will move upwardly on post 14, and vice versa.

Each ear member 18 on collar 16 is pivotally connected to a radial link bar 34, and the several link bars are equally spaced around the axis of post 14. Link bars 34, as shown, have tines 35 at lower ends 36 which are pivotally connected to ear members 18 as by pivot pins 38.

A collar 40 is rigidly mounted on post 14 above slidable collar 16. As shown by way of example in FIG. 3, bolts 42 extend through aligned openings in collar 40 and post 14 to lock the collar in a fixed position on the post.

Three radially extending tire support bars 44 are rigidly secured to collar 40 in uniform angularly spaced relationship to each other around the axis of post 14.

Figure 2:
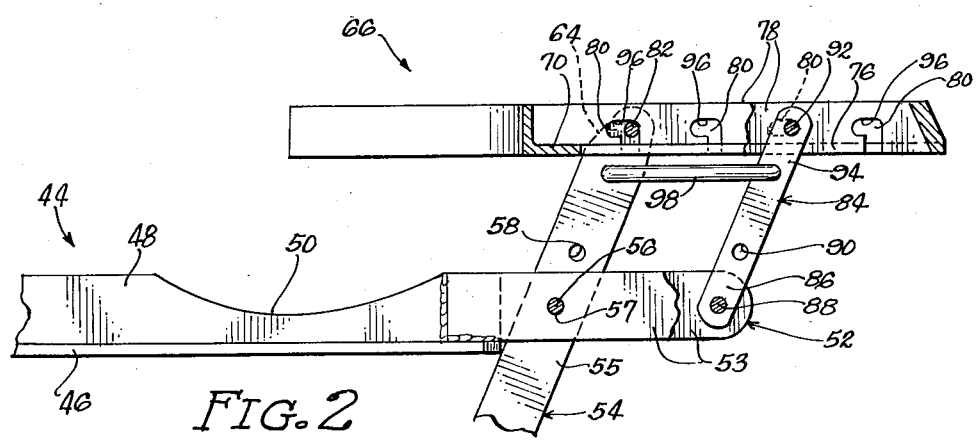
FIG. 2 is a fragmentary elevational view, partly in section, showing certain linkage used in the apparatus of FIG. 1.

As best seen in FIGS. 2 and 3, each support bar 44, in the illustrated form of the invention, comprises a horizontal portion 46 and a vertical portion 48 which may have a tire receiving recess 50. The free end of portion 48 terminates in tines 53.

A clamp actuating lever 54 is provided for each support bar 44. A lever 54 has opposed ends 59 and 64, and an intermediate portion 55 which is pivotally mounted between tines 53 of a support bar 44 by a pivot pin 56. This pin extends through aligned openings 57 in tines 53 and one of a series of centrally positioned openings 58 in lever 54, see FIGS. 1 and 2. Lower end 59 of a lever 54 is positioned between tines 61 of upper end 60 of a link bar 34, and is pivotally secured thereto by pivot pin 62.

Figure 6:
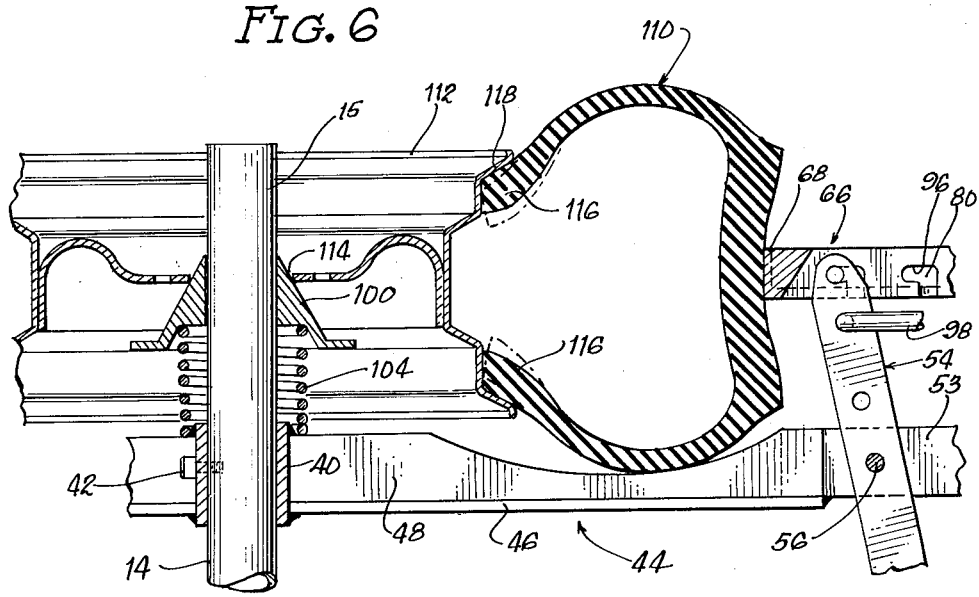
FIG. 6 is an enlarged, sectional view of a portion of the apparatus and associated tire and wheel showing a clamp pressing against a tread portion of the tire and the relationship between the tire beads and the wheel rim.
Figure 5:
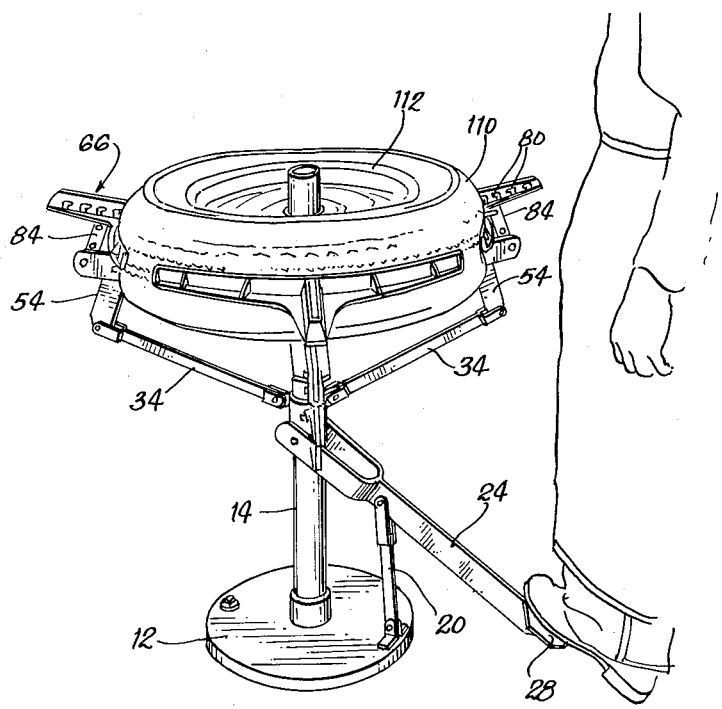
FIG. 5 is a reduced view like that shown in FIG. 4, but with the circumferential tread portions of the tire being compressed.

With this arrangement described so far, upward movement of collar 16 causes upper ends 60 of link bars 34 to move outwardly away from post 14. This causes the lower ends 59 of actuating levers 54 also to move outwardly, and pivots the levers 54 so upper ends 64 thereof move inwardly toward post 14, as shown in FIGS. 5 and 6.

A tire clamp 66 is pivotally mounted on upper end 64 of each clamp actuating lever 54. As best shown in FIG. 1, each tire clamp includes an arcuate tire engaging portion 68 and an integral or attached base plate 70. The portion 71 (FIG. 4) of base plate 70 adjacent the center of arcuate portion 68 extends radially outwardly. This portion of the base plate has a radially extending slot 76 see FIG. 2. Side members 78 extend upwardly from plate 70 along the sides of slot 76.

A series of horizontally spaced pin receiving slots 80 of inverted L-shape or the like are formed in side members 78 of each clamp 66. These slots extend into plate 70 and communicate with radially extending slot 76 for reasons to become apparent below. The respective slots in each pair of side members are transversely aligned. The upper edges 96 of the slots 80 define pin engaging seats as described below.

A transverse pin 82 (FIGS. 2 and 6) extends through upper end 64 of each actuating lever 54 and is secured thereto in any suitable manner. This pin is sized to pass through the enlarged portions of slot 76 of base plate 70 of a clamp 66 and to penetrate selectively a pair of the aligned slots 80. With this arrangement, as explained below, a clamp 66 is connected for radial adjustment to an actuating lever 54.

In order to hold a tire clamp 66 in horizontal position, a support link 84 (FIG. 2) is provided for each clamp. Lower end 86 of a support link 84 is positioned between tines 53 of one of the radial support bars 44. A pivot pin 88 extends through aligned openings in tines 53 and through one of a series of holes 90 in a support link 84 whereby lower end 86 of a support link 84 is pivotally connected to support bar 44. A transverse pin 92 extends through upper end 94 of each link 84.

A rod 98 is pivotally connected between an actuating lever 54 and an associated support link 84 to hold the lever and link in parallel relationship. As seen in FIG. 2, each tire clamp 66 is mounted and held in a horizontal position with the upper edges or seats 96 of selected slots 80 resting on pins 82 and 92. The series of slots 80 in clamps 66 and the series of holes 58 and 90 in actuating levers 54 and support links 84 permit the apparatus to be adjustable and thus accommodate tires of different sizes.

A centering cone 100 is concentric with and slidably mounted on the upper end of support post 14. A coil spring 104 surrounds post 14 and is positioned between fixed collar 40 and slidable cone 100 so that the centering cone is resiliently mounted with respect to tire support bars 44.

In operation, as shown in FIG. 4, an uninflated tubeless tire 110 and associated wheel 112 are mounted on apparatus 10 with upper end 15 of post 14 extending through axle receiving opening 114 in the wheel. As best seen in FIG. 6, cone 100 also extends partially through wheel opening 114 and acts to center the wheel on post 14. Tire 110 rests in recesses 50 in the tire support bars 44 and thus is supported in a horizontal position concentric with support post 14.

As mentioned above, tire clamps 66 are positioned radially in accordance with the size of the tire. If it is necessary to reposition clamps 66 it is only necessary to lift the clamps 66 upwardly from pins 82 and 92 and move them so the pins enter the desired other slots.

After the clamps 66 are properly positioned radially and vertically, the operator actuates pedal 28 (FIG. 5) and this, as explained above, causes the clamps to move inwardly, thus exerting radial pressure on the tire by squeezing circumferential tread portions of the tire. The pressure exerted by each clamp is applied over a substantial portion of the circumference of the tire. When the tread portions of the tire are thus squeezed, tire beads 116 move apart from their dotted line uninflated position (FIG. 6) into air-sealing engagement with bead seats 118 on the wheel 112, at which time the tire may be inflated in conventional manner.

When the operator removes his foot from pedal 28, the weight of the various members cooperates to return foot lever 24 to the starting position shown in FIGS. 1 and 4.

The illustrated apparatus is actuated by a foot pedal so as to free the hands of the operator during use of the apparatus. This is an efficient and satisfactory way to operate the device. However, if desired the apparatus may be driven by a suitable power source such, for example, as a hydraulic system coupled to collar 16.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A tubeless tire bead seating apparatus comprising a base, an upstanding support post mounted on said base, a collar slidably mounted on said post, a strut member mounted in a pivoted manner on said base, a foot lever having opposed ends and an intermediate portion, a pedal on one end of said foot lever, the opposite end of said foot lever pivotally connected to said collar, the intermediate portion of said foot lever pivotally connected to said strut member whereby when said pedal is depressed said collar moves upwardly on said support post, a plurality of radial link bars in uniform and angularly spaced relation around the axis of said support post, each link bar having its inner end pivotally connected to said collar, a plurality of actuating levers, each actuating lever including opposed ends and an intermediate portion, the outer end of each link bar pivotally connected to one end of an actuating lever, a plurality of radial tire support bars rigidly mounted on said support post in uniform and angularly spaced relation to each other, said tire support bars adapted to hold a tubeless tire and wheel concentric with said support post, the intermediate portion of each actuating lever pivotally connected to one of said tire support bars, a transverse pin in the other end of each actuating lever, a tire clamp associated with each actuating lever, each tire clamp comprising a base plate and an arcuate tire tread engaging portion, said base plate having a radially extending slot, side members extending upwardly from said base plate at the sides of said radially extending slot, said side walls having a series of horizontally spaced inverted L-shaped pin receiving slots communicating with said radially extending slot, the upper edges of said slots comprising pin engaging seats, each of said transverse pins in said actuating levers adapted to penetrate selectively an aligned pair of said pin receiving slots to engage said seats, and a pivoted support link interconnecting each tire clamp with its associated tire support bar, said support links detachably secured to said tire clamps, whereby said tire clamps are supported by said actuating levers and support links and are radially adjustable on said apparatus to accommodate tires of different sizes, and whereby downward movement of said pedal causes inward movement of said tire clamps.

2. A tubeless tire bead seating apparatus comprising an upstanding support post, a collar slidably mounted on said post, means connected to said collar for moving said collar along said post, tire and wheel support means mounted on said post, tire clamps pivotally mounted on said support means for movement toward and away from the axis of said post, each tire clamp including a base plate and an arcuate tire engaging portion, said base plate having a radially extending slot, and side members extending upwardly from said base plate at the sides of said radially extending slot, said side members having a series of spaced, transversely aligned inverted L-shaped slots, said slots communicating with said radially extending slot, and a linkage mechanism connected between each tire clamp and said collar, said linkage mechanism including an actuating lever pivotally mounted intermediate its ends to said tire and wheel support means, an end portion of said actuating lever extending through said radially extending slot in said base plate and having means for selective engagement in any one of said L-shaped slots, the other end of said actuating lever being pivotally linked with said collar, whereby when said collar is moved along said post in one direction, said tire clamps move toward said post and into engagement with a tire mounted on said support means whereby the tread portion of the tire is squeezed causing the tire beads to expand into air-sealing engagement with a wheel rim.

3. A tire clamp for a tubeless tire bead seating apparatus comprising a base plate and an arcuate tire engaging portion, said base plate having a radially extending slot, and side members extending upwardly from said base plate at the sides of said radially extending slot, said side members having a series of spaced, transversely aligned inverted L-shaped slots, said slots communicating with said radially extending slot.

References Cited in the file of this patent

UNITED STATES PATENTS

| | | |
|---|---|---|
| 560,354 | Hain | May 19, 1896 |
| 1,399,770 | House | Dec. 13, 1921 |
| 1,738,504 | Stevens | Dec. 3, 1929 |
| 2,712,850 | Rerick | July 12, 1955 |
| 2,762,424 | Zito | Sept. 11, 1956 |
| 2,873,796 | Riley | Feb. 17, 1959 |